(12) United States Patent
Han et al.

(10) Patent No.: US 8,508,637 B2
(45) Date of Patent: Aug. 13, 2013

(54) IMAGE SENSOR AND IMAGE PROCESSING METHOD TO ACQUIRE A HIGH-SENSITIVITY IMAGE

(75) Inventors: Sang-wook Han, Seoul (KR); Hyun-chul Song, Seoul (KR); Won-hee Choe, Gyeongju-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 302 days.

(21) Appl. No.: 12/834,320

(22) Filed: Jul. 12, 2010

(65) Prior Publication Data

US 2011/0013040 A1   Jan. 20, 2011

(30) Foreign Application Priority Data

Jul. 14, 2009 (KR) .................. 10-2009-0064115

(51) Int. Cl.
*H04N 3/14* (2006.01)
*H04N 5/335* (2011.01)

(52) U.S. Cl.
USPC .......................... 348/297; 348/308; 348/362

(58) Field of Classification Search
USPC ............. 348/207.99, 222.1, 300, 308, 297; 348/362; 250/208.1; 702/81
See application file for complete search history.

(56) References Cited

U.S. PATENT DOCUMENTS

| 7,233,354 B2* | 6/2007 | Voss et al. ............... 348/308 |
| 7,304,674 B2* | 12/2007 | Mentzer et al. ............... 348/300 |
| 7,623,173 B2 | 11/2009 | Nitta et al. |
| 2008/0088725 A1 | 4/2008 | Matsunaga |
| 2008/0291295 A1 | 11/2008 | Kato et al. |
| 2008/0297637 A1 | 12/2008 | Gomi |
| 2008/0316346 A1 | 12/2008 | Watanabe |
| 2009/0016625 A1 | 1/2009 | Kim et al. |
| 2009/0030630 A1* | 1/2009 | Eitan et al. ............... 702/81 |
| 2009/0033792 A1 | 2/2009 | Kano et al. |
| 2010/0066849 A1* | 3/2010 | Lim et al. ............... 348/222.1 |

FOREIGN PATENT DOCUMENTS

| JP | 2006-295231 | 10/2006 |
| JP | 2007-116479 | 5/2007 |
| JP | 2008-098971 | 4/2008 |
| JP | 2008-160880 | 7/2008 |
| JP | 2008-206143 | 9/2008 |
| JP | 2008-294689 | 12/2008 |
| JP | 2008-300898 | 12/2008 |
| JP | 2009-005111 | 1/2009 |
| JP | 2009-005318 | 1/2009 |
| JP | 2009-037460 | 2/2009 |
| KR | 10-2009-0005843 | 1/2009 |

* cited by examiner

OTHER PUBLICATIONS

Kim et al., "½-Inch 7.2MPixel CMOS Image Sensor with 2.25 μm Pixels Using 4-Shared Pixel Structure for Pixel-Level Summation," *In Proceedings of the 2006 IEEE International Solid-State Circuits Conference (ISSCC 2006)*, Feb. 8, 2006, pp. 1994-2003.

*Primary Examiner* — Nelson D. Hernández Hernández
*Assistant Examiner* — Dennis Hogue
(74) *Attorney, Agent, or Firm* — NSIP Law

(57) ABSTRACT

Disclosed are an image sensor and a local binning method in which binning is applied selectively. For example, binning is applied to pixels having low illumination and binning is not applied to non-low illumination pixels. Information on pixels having low illumination for a first image frame may be stored and used to perform binning with respect to areas of a second image frame corresponding to low illumination pixel areas determined with respect to the first image frame.

42 Claims, 12 Drawing Sheets

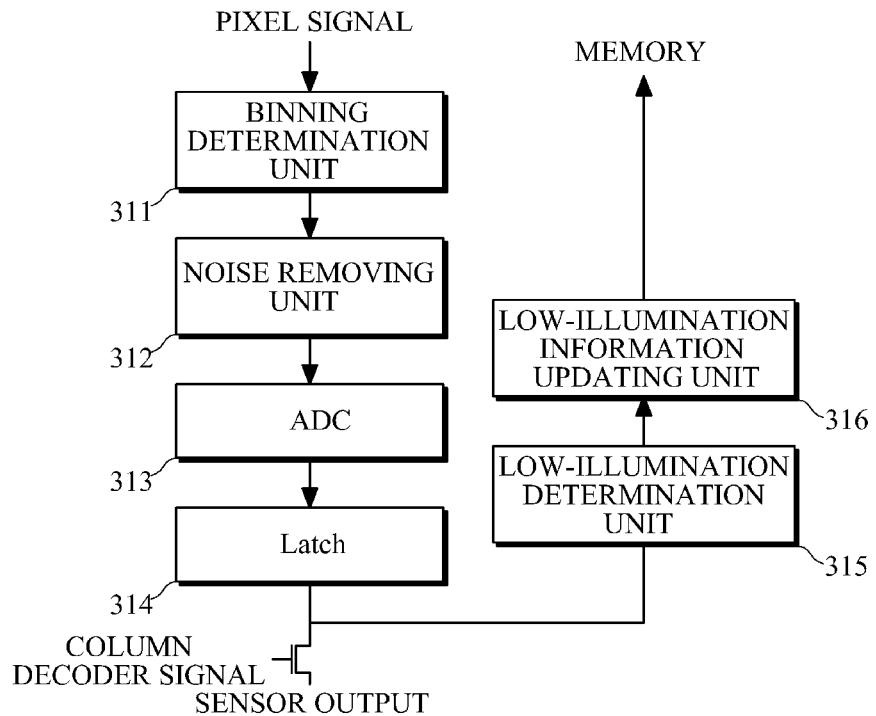
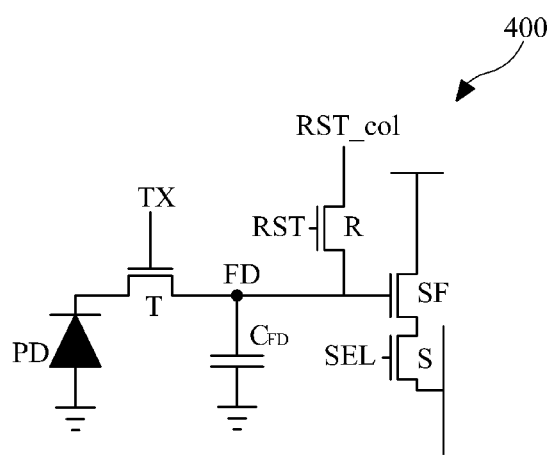

IMAGE SENSOR AND IMAGE PROCESSING METHOD TO ACQUIRE A HIGH-SENSITIVITY IMAGE

CROSS-REFERENCE TO RELATED APPLICATION(S)

This application claims the benefit under 35 U.S.C. §119(a) of Korean Patent Application No. 10-2009-0064115, filed on Jul. 14, 2009, the entire disclosure of which is incorporated herein by reference for all purposes.

BACKGROUND

1. Field

The following description relates to an image sensor, and additionally, to an image sensor to acquire a high-sensitivity image.

2. Description of the Related Art

Interest in image sensors with high-sensitivity has increased over the years. A high-sensitivity sensor can acquire relatively high-quality images even at a high frame rate so as to capture a high-speed moving object, as well as acquire high-quality images in dark or less lighted places.

One technology that is generally adapted for high-sensitivity sensors is "binning." Binning combines values of adjacent pixels and can be implemented by combining charges accumulated in pixels or by combining analog output values of pixels in a column circuit. Also, binning may be performed by a digital image processor. Conventional binning methods may enhance sensitivity, but deteriorate spatial resolution because they are applied over the entire area of an image.

SUMMARY

In one general aspect, there is provided an image sensor including a pixel array having a plurality of unit pixels, and a column readout circuit having a plurality of column readout units, each column readout unit provided for a line of the plurality of unit pixels. The column readout circuit acquires an image frame from the pixel array, creates low illumination area information indicating low illumination areas of the image frame, and in response to another image frame being received, performs local binning on areas of the another image frame corresponding to the low illumination areas.

The low illumination area information of the image frame may indicate which unit pixels of the plurality of unit pixels have low illumination, and the low illumination area information may be stored in the plurality of unit pixels and read from the plurality of unit pixels through the column readout units.

The column readout circuit may perform local binning on the areas corresponding to the low illumination areas in an analog domain using an image signal of the another image frame.

A column readout unit of the plurality of column readout units may include a binning determination unit to determine whether an image signal output from a unit pixel is to be binned with an image signal of another unit pixel, based on low illumination information read from the unit pixel, and to perform binning using the image signal read from the another unit pixel on the same row according to the result of the determination. The column readout unit may further include a noise removing unit to remove noise from the image signal, an analog-to-digital converter to convert the noise-removed image signal into a digital image signal, a latch to store the digital image signal, a low illumination determination unit to determine whether the image signal output from the unit pixel has low illumination using the digital image signal, and a low illumination information updating unit to update previously stored low illumination information according to the result of the determination.

The updated low illumination information may be stored in the unit pixel and used to determine through the binning determination unit whether binning is to be performed on an image signal of still another image frame during a processing period of the still another image frame.

A unit pixel of the plurality of unit pixels may include a photodiode to receive light and create photocharges, a transmission transistor connected to the photodiode, to transfer the photocharges, a floating diffusion node to accumulate the photocharges transferred from the transmission transistor, a reset transistor to discharge the photocharges accumulated in the floating diffusion node, a source follower transistor to amplify the photocharges accumulated in the floating diffusion node into a voltage signal, and a selector transistor to selectively output an image signal of the unit pixel, wherein a drain of the reset transistor is connected to a signal line which transfers low illumination information determined by a corresponding column readout unit and indicating whether a value output from the photodiode corresponds to low illumination in the image frame.

The low illumination information may be stored in a capacitor of the floating diffusion node.

The low illumination information may be stored in the floating diffusion node, the low illumination information stored in the floating diffusion node and indicating whether an image signal of the image frame has low illumination may be read from the floating diffusion node before the reset transistor is turned on and thus a reset signal is output, and after an image signal created by accumulation of photocharges of the photodiode for a current image frame is output, low illumination information indicating whether the image signal for the current image frame has low illumination may be stored in the floating diffusion node.

The column readout circuit may control each unit pixel of the pixel array to perform local binning in a charge domain.

A column readout unit of the plurality of column readout units may include a binning determination unit to determine whether an image signal output from a unit pixel is to be binned with an image signal of another unit pixel, based on low illumination information read from the unit pixel, and to generate a control signal to perform local binning in the charge domain according to the result of the determination. The column readout unit may further include a noise removing unit to remove noise from the image signal, an analog-to-digital converter to convert the noise-removed image signal into a digital image signal, a latch to store the digital image signal, a low illumination determination unit to determine whether the image signal output from the unit pixel has low illumination using the digital image signal, and a low illumination information updating unit to update the low illumination information according to the result of the determination.

Binning may be controlled for each unit pixel.

A unit pixel of the plurality of unit pixels may include a photodiode to receive light and create photocharges, a transmission transistor connected to the photodiode, to transfer the photocharges, a transmission control transistor to control the transmission transistor, a floating diffusion node to accumulate the photocharges transferred from the transmission transistor, a reset transistor to discharge the photocharges accumulated in the floating diffusion node, a source follower transistor to amplify the photocharges accumulated in the floating diffusion node into a voltage signal, and a selector transistor to selectively output an image signal of the unit pixel, wherein a drain of the reset transistor is connected to a signal line which transmits low illumination information indicating low illumination or non-low illumination, and the floating diffusion node is connected to a node which receives photocharges transmitted from another photodiode.

When both the transmission control transistor and the transmission transistor are turned on, the photocharges accumulated by the photodiode may be transferred to the floating diffusion node.

The low illumination information may be stored in a capacitor of the floating diffusion node.

The low illumination information may be stored in the floating diffusion node, the low illumination information stored in the floating diffusion node and indicating whether an image signal of the image frame has low illumination may be read from the floating diffusion node before the reset transistor is turned on and thus a reset signal is output, and after an image signal created by accumulation of photocharges of the photodiode for a current image frame is output, low illumination information indicating whether the image signal for the current image frame has low illumination may be stored in the floating diffusion node.

In another general aspect, there is provided an image processing method performed by an image sensor, the method including creating low illumination area information indicating low illumination areas of an image frame received from a pixel array having a plurality of unit pixels, storing the created low illumination area information, and in response to another image frame being received, performing local binning on areas of the another image frame corresponding to the low illumination areas indicated by the low illumination area information.

The low illumination area information of the image frame may indicate which unit pixels of the plurality of unit pixels have low illumination, and the low illumination area information may be stored in the plurality of unit pixels.

The low illumination area information may be stored in unit pixels included in the image sensor, or in a separate memory.

The low illumination area information may be updated in response to a new image frame being received.

The local binning may be performed in at least one of a charge domain, an analog domain and a digital domain.

In still another general aspect, there is provided an image sensor including an array configured to acquire an image, a determination unit configured to identify pixels of an acquired image for selective binning, according to output values of the pixels, and a binning unit configured to perform binning with respect to pixels of another acquired image corresponding to the pixels of the acquired image selected for binning.

The determination unit may determine a pixel of the acquired image whose output value is equal to or less than a predetermined value, less than that of an adjacent pixel, or equal to or less than a predetermined value less than that of an adjacent pixel as a pixel with low illumination for selective binning.

The determination unit may identify pixels of the acquired image having relatively low illumination compared to other pixels of the acquired image for selective binning, and the binning unit may perform binning with respect to pixels of the another acquired image corresponding to the pixels of the acquired image having low illumination.

The determination unit may identify pixels of a first image having relatively low illumination compared to other pixels of the first image for selective binning, and the binning unit may perform binning with respect to pixels of a second image corresponding to the pixels of the first image having low illumination to produce a first processed image.

The determination unit may identify pixels of the second image having relatively low illumination compared to other pixels of the second image for selective binning, and the binning unit may perform binning with respect to pixels of a third image corresponding to the pixels of the second image having low illumination to produce a second processed image.

The acquired image may provided by a predetermined number of pixels, the determination unit may identify part of the predetermined number of pixels of the acquired image having relatively low illumination compared to other pixels of the acquired image for selective binning, and the binning unit may perform binning with respect to pixels of the another acquired image corresponding to the part of the predetermined number of pixels of the acquired image having low illumination.

The binning may be performed in at least one of a charge domain, an analog domain and a digital domain.

In still another general aspect, there is provided an image processing method performed by an image sensor having an array, a determination unit and a binning unit, the method including acquiring an image by the array, identifying, by the determination unit, pixels of the acquired image for selective binning, according to output values of the pixels, and binning, by the binning unit, with respect to pixels of another acquired image corresponding to the pixels of the acquired image selected for binning.

The identifying may include determining a pixel of the acquired image whose output value is equal to or less than a predetermined value, less than that of an adjacent pixel, or equal to or less than a predetermined value less than that of an adjacent pixel as a pixel with low illumination for selective binning.

The identifying may include identifying pixels of the acquired image having relatively low illumination compared to other pixels of the acquired image for selective binning, and the binning may include binning with respect to pixels of the another acquired image corresponding to the pixels of the acquired image having low illumination to produce a first processed image.

The image processing method may further include identifying, by the determination unit, pixels of the another acquired image having relatively low illumination compared to other pixels of the another acquired image for selective binning, and binning, by the binning unit, with respect to pixels of still another acquired image corresponding to the pixels of the another acquired image having low illumination to produce a second processed image.

The acquired image may be provided by a predetermined number of pixels, the identifying may include identifying part of the predetermined number of pixels of the acquired image having relatively low illumination compared to other pixels of the acquired image for selective binning, and the binning may include binning with respect to pixels of the another acquired image corresponding to the part of the predetermined number of pixels of the acquired image having low illumination.

The binning may include binning in at least one of a charge domain, an analog domain and a digital domain In still another general aspect, there is provided an electronics device including a housing defining the electronics device, and an image sensor. The image sensor includes an array configured to acquire an image, a determination unit configured to identify pixels of an acquired image for selective binning, according to output values of the pixels, and a binning unit configured to perform binning with respect to pixels of another acquired image corresponding to the pixels of the acquired image selected for binning.

The determination unit may determine a pixel of the acquired image whose output value is equal to or less than a predetermined value, less than that of an adjacent pixel, or equal to or less than a predetermined value less than that of an adjacent pixel as a pixel with low illumination for selective binning.

The determination unit may identify pixels of the acquired image having relatively low illumination compared to other pixels of the acquired image for selective binning, and the binning unit may perform binning with respect to pixels of the another acquired image corresponding to the pixels of the acquired image having low illumination to produce a first processed image.

The determination unit may identify pixels of the another acquired image having relatively low illumination compared to other pixels of the another acquired image for selective binning, and the binning unit may perform binning with respect to pixels of still another acquired image corresponding to the pixels of the another acquired image having low illumination to produce a second processed image.

The acquired image may be provided by a predetermined number of pixels, the determination unit may identify part of the predetermined number of pixels of the acquired image having relatively low illumination compared to other pixels of the acquired image for selective binning, and the binning unit may perform binning with respect to pixels of the another acquired image corresponding to the part of the predetermined number of pixels of the acquired image having low illumination.

The binning may be performed in at least one of a charge domain, an analog domain and a digital domain.

The electronics device may be one of a cellular/mobile phone, a personal digital assistant (PDA), a digital camera, a portable game console, an MP3 player, a portable/personal multimedia player (PMP), a handheld e-book, a portable tablet/lab-top PC, a global positioning system (GPS) navigation, a camcorder, a robot, a security camera device, a web camera device, a television, a monitor, and a home-entertainment setup box.

Other features and aspects will be apparent from the following detailed description, the drawings, and the claims.

BRIEF DESCRIPTION OF THE DRAWINGS

FIG. 3 is a diagram illustrating a configuration of a column readout unit according to an example embodiment.

FIG. 4 is a circuit diagram illustrating a pixel structure which allows analog local binning, according to an example embodiment.

Figure 1:
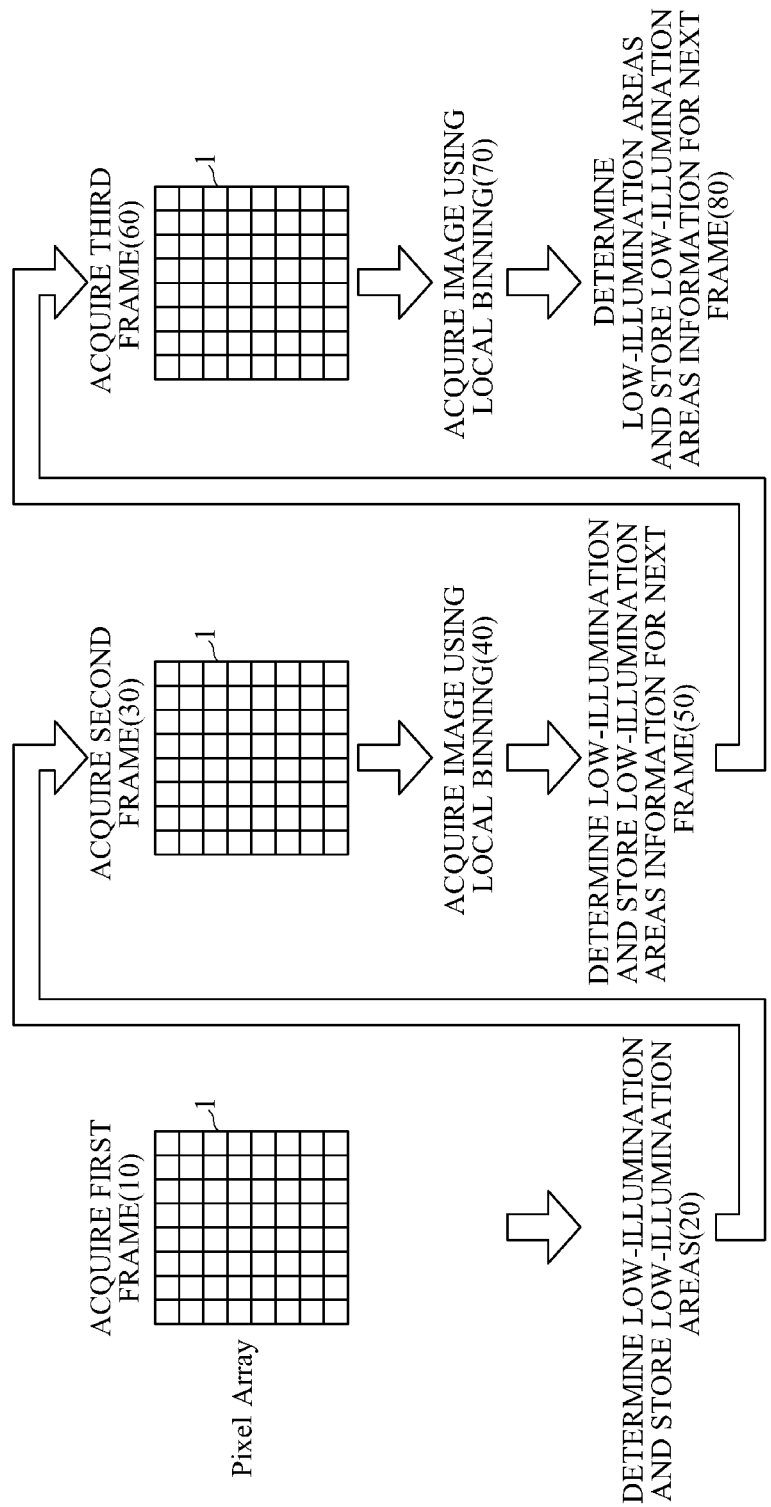
FIG. 1 is a diagram illustrating a local binning procedure according to an example embodiment.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. The progression of processing steps and/or operations described is an example; however, the sequence of steps and/or operations is not limited to that set forth herein and may be changed as is known in the art, with the exception of steps and/or operations necessarily occurring in a certain order. Also, descriptions of well-known functions and constructions may be omitted for increased clarity and conciseness.

A local binning procedure according to an example embodiment is explained below with reference to FIG. 1.

According to an aspect, local binning comprises applying binning to pixels or pixel areas having low illumination and not applying binning to non-low illumination pixels or pixel areas. According to the local binning, high-resolution, high-quality images can be obtained by acquiring image information of pixel areas at which no image information would have been acquired due to low illumination with binning, while preventing or minimizing loss in spatial resolution by acquiring image information of other pixel areas without binning.

In order to apply binning selectively to low illumination pixel areas, a determination is made as to which pixels are low illumination pixels. As an example, the determination is carried out by checking the output values of individual pixels for each frame, and if there are pixels whose output values are too small to acquire a high-definition image, for example, the output values being less than a predetermined value, those pixels are determined as the low illumination pixels.

Here, a frame may refer to an image created when, for example, all pixel values on a pixel array are output. Also, low illumination may occur when the amount of received light is less than a predetermined threshold value. For example, if the output values of certain pixels are less than those of adjacent pixels (or pixel areas) or are below a predetermined pixel value less than the pixel values of adjacent pixels, the pixels may be determined as being low illumination pixels.

Based on the result of the determination, a low illumination map is created that indicates which pixels are low illumination pixels. Then, when an image of a next frame is output, binning is performed on pixels determined to be low illumination pixels in the previous frame, low illumination pixel areas are again determined with respect to the output image, and then the result of the determination are reflected in the low illumination map to update it. Accordingly, binning at still the next frame may be controlled according to the updated low illumination map. The process may be repeated for each frame.

In another implementation, the low illumination map may not be necessarily created based on determinations on whether the pixel values of all individual pixels in a pixel array are less than a predetermined threshold value. For example, a lower-resolution image may be created using pixel values of some of the pixels in a pixel array. Then a lower-resolution, low illumination map may be created based on the created lower-resolution image, and thereafter, local binning may be performed on a higher-resolution image created secondarily using the lower-resolution, low illumination map information.

Referring back to FIG. 1, a first image frame created by light incident on a pixel array 1 arranged in a matrix form is acquired (10). Then low illumination area information with respect to the first image frame is created and stored (20).

Then, a second image frame is acquired (30). Local binning is performed on areas of the second image frame, corresponding to the low illumination areas determined with respect to the first image frame. Accordingly, a new second image frame subjected to the local binning only with respect to its low illumination areas is acquired (40). Then, low illumination areas of the acquired second image frame, which will be applied to an image frame that is to be next input, are determined and stored (50).

If a third image frame is acquired (60), local binning is performed on areas of the third image frame, corresponding to the low illumination areas determined with respect to the second image frame, and a new third image frame subjected to local binning only with respect to its low illumination areas is acquired (70). Then, low illumination areas of the acquired third image frame, which will be applied to an image frame that is to be next input, are determined and stored (80).

The binning may be performed by pixel, by an analog readout circuit or by a digital algorithm. The local binning according to an embodiment may utilize one or more of local binning by pixels, local binning by a column readout circuit and local binning by a digital domain.

Conventional global binning, that is, conventional binning applied over the entire area of an image, can achieve high sensitivity, but is subject to a greater loss in spatial resolution, whereas the local binning according to an example described herein prevents deterioration in spatial resolution in non-low illumination areas. Furthermore, in the local binning, by increasing sensitivity of only low illumination areas, dynamic range at low illumination areas may be extended.

Figure 2:
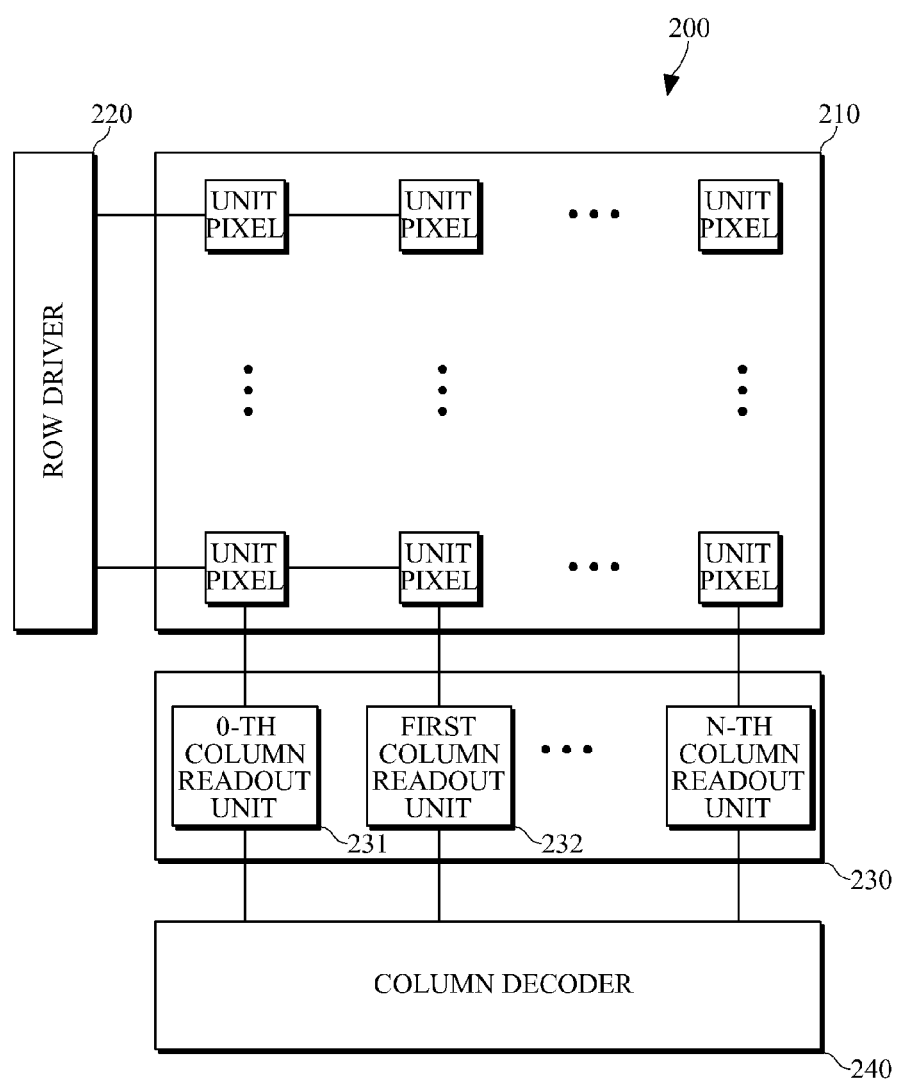
FIG. 2 is a diagram illustrating a configuration of an image sensor according to an example embodiment.

FIG. 2 illustrates a configuration of an image sensor 200 according to an example embodiment.

The image sensor 200 includes a pixel array 210, a row driver 220, a column readout circuit 230 and a column decoder 240.

The pixel array 210 converts optical signals into analog signals and includes a plurality of unit pixels arranged in a matrix form.

The row driver 220 selects row lines of the pixel array 210 and generates pixel driving signals.

The column readout circuit 230 reads out signals transmitted from the pixel array 210. The column decoder 240 decodes address signals of a column direction and allows the signals to be read out by the column readout circuit 230, to be sequentially output. The terms "column" and "row" used herein may refer to a line of pixels, for example, a line of pixels whose pixel values are read out, and may not necessarily mean a vertical or horizontal direction.

The column readout circuit 230 creates low illumination area information indicating low illumination areas for an input image frame, and for example, controls areas of a next image frame, corresponding to the low illumination areas indicated by the low illumination area information, to be subjected to local binning. The low illumination area information indicates which areas of the input image frame have low illumination and may be stored in the corresponding ones of the plurality of unit pixels. That is, the low illumination area information for the input image frame indicates which unit pixels of the plurality of unit pixels have low illumination in an image signal of the previous image frame, and the low illumination area information for the image frame is stored in the plurality of unit pixels and read from the plurality of unit pixels through column readout units of the column readout circuit 230. Since the low illumination area information is not necessarily created for all individual pixels, the low illumination area information may be created by a part of the pixel values of the previous image frame.

In the column readout circuit 230, the column readout units (231, 232, . . . ) are provided for the respective columns of the pixel array 210. Each column readout unit may include an analog circuit for removing noise and an Analog-to-Digital Converter (ADC). For example, if pixel signals corresponding to rows are transmitted to the respective column readout units (231, 232, . . . ), the pixel signals are subjected to noise removal by the respective analog circuits in the column readout units (231, 232, . . . ), converted into digital values and then the digital values are stored in latches. The process may proceed in parallel for each column. Thereafter, if column decoding signals are sequentially applied to the respective columns, the pixel values stored in the pixels are output one by one as sensor outputs. Meanwhile, the column readout units (231, 232, . . . ) each further performs the operation of reading out and storing low illumination information, in addition to reading out non-low image signals of pixels. A column readout unit 300 according to an example embodiment which supports local binning is illustrated in FIG. 3.

The column readout unit 300 may include a binning determination unit 311, a noise removing unit 312, an ADC, a latch 314, a low-illumination determination unit 315, and a low-illumination information updating unit 316. An operation of the column readout unit 300 is provided below.

Referring to FIG. 3, low illumination information indicating to which pixels low illumination image signals have been applied is provided to the binning determination unit 311. The low illumination information indicating to which pixels low illumination image signals have been applied may be stored in the corresponding pixels, in the image sensor 200 or in a separate external memory. Accordingly, the binning determination unit 311 receives low illumination information from the corresponding pixels or from a separate memory, and if the low illumination information indicates that the corresponding pixels have low illumination, the binning determination unit 311 determines that binning is to be performed, and if the low illumination information indicates that the corresponding pixels do not have low illumination, the binning determination unit 311 determines that binning need not be performed. According to an embodiment, the binning determination unit 311 may be configured to receive image signals (or pixel values) from the pixel array 210 and perform binning directly in an analog domain, or to control the pixel array 210 to perform binning in a charge domain and then receive the results of the binning from the pixel array 210.

In the case where the pixel array 210 is configured to include a color filter to acquire color information, binning may be performed between pixels of adjacent columns having the same color. For example, if a pixel of a certain column is a pixel belonging to a low illumination area, the binning determination unit 311 receives an image signal output from a pixel of an adjacent column having the same color and performs analog binning. As another example, the binning determination unit 311 may perform control operations for binning in a charge domain in order to combine pixel values of pixels having the same color. It is understood that the binning determination unit 311 may operate based on one of various methods that can determine whether to perform binning depending on the output values of pixels of corresponding columns.

Pixel signals subjected to or not subjected to binning by the binning determination unit 311 are transferred to the noise removing unit 312. The noise removing unit 312 performs correlated double sampling (CDS). For example, the noise removing unit 312 removes noise from the received signal created by photocharges accumulated in the pixel, and transfers the noise-removed image to the ADC 313. The ADC unit 313 converts the received image signal into a digital signal and the converted digital signal is stored in the latch 314.

The low illumination determination unit 315 determines whether a read image signal has low illumination based on the image signal stored in the latch 314, and the low illumination information updating unit 316 updates low illumination information according to the result of the determination. The low illumination information may be stored in an analog memory of the pixel from which the image signal has been read. For example, the low illumination determination unit 315 may write a "high" voltage in a pixel if the pixel is a low illumination pixel, and may write a "low" voltage in a pixel if the pixel is not a low illumination pixel. The operation may be carried out in column-parallel.

In the example above, low illumination information is stored in a pixel. However, as additional examples, the low illumination information may be stored in a separate frame memory (not shown) included in the image sensor 200 or in a frame memory (not shown) outside the image sensor 200.

Meanwhile, in the case of a sensor which adapts a pixel structure allowing binning in a charge domain, the sensor may perform analog binning which is generally performed by a column readout circuit. In the case of performing local binning both in an analog domain and in a charge domain, the effect of sensitivity enhancement may be strengthened. By using the column readout circuit described above in association with analog binning while applying binning in a charge domain, binning both in an analog domain and in a charge domain may be implemented.

FIG. 4 illustrates a pixel structure 400 according to an example embodiment which allows analog local binning.

Referring to FIG. 4, the pixel 400 includes a photodiode PD, a transmission transistor T, a floating diffusion node capacitor $C_{FD}$, a reset transistor R, a source follower transistor SF and a selector transistor S.

The photodiode PD receives light and creates photocharges.

The transmission transistor T connects to the photodiode PD and transfers the photocharges to a floating diffusion node FD according to a signal TX.

The floating diffusion node capacitor $C_{FD}$ accumulates the photocharges transferred through the transmission transistor T. According to an embodiment, low illumination information may be stored in the floating diffusion node capacitor $C_{FD}$ of the floating diffusion node FD. The floating diffusion node capacitor $C_{FD}$ may be implemented by, for example, connecting a separate capacitor to the FD node or by utilizing a parasitic capacitor of the FD node. Utilizing the parasitic capacitor of the FD node does not require additional hardware.

The reset transistor R discharges photocharges accumulated in the floating diffusion node FD.

The source follower transistor SF amplifies the photocharges accumulated in the floating diffusion node capacitor $C_{FD}$ into a voltage signal.

The selector transistor S outputs an output voltage selectively according to a selection signal SEL.

In the pixel 400 illustrated in FIG. 4, a drain node of an RST signal is connected to an RST_col signal line, not to a supply voltage $V_{DD}$ as may be in a general 4-transistor (4Tr) structure. A voltage of the RST_col line is adjusted depending on an operation sequence. To the RST_col line, a reset voltage (for example, VDD), a "high" voltage ($V_{HIGH}$) indicating low illumination and a "low" voltage ($V_{LOW}$) indicating non-low illumination may be applied.

Also, low illumination information indicating whether a value of the corresponding unit pixel in the previous image frame belongs to low illumination may be temporarily stored in the floating diffusion node capacitor $C_{FD}$ at a time different from when photocharges in the photodiode PD are transferred, and the low illumination information may be output at a time different from when an image signal corresponding to the photocharges is output.

Figure 5:
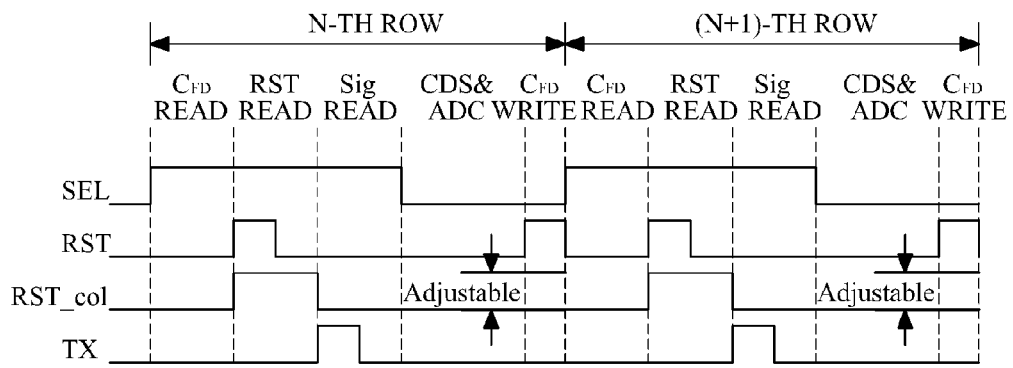
FIG. 5 is a timing diagram illustrating an operation of the pixel which allows analog local binning illustrated in FIG. 4.

FIG. 5 shows a timing diagram illustrating an operation of the pixel (400 in FIG. 4) which allows analog local binning.

As illustrated, the operation of the pixel in FIG. 5 includes a $C_{FD}$ READ period for reading low illumination information and a $C_{FD}$ WRITE period for writing low illumination information.

With reference to FIGS. 4 and 5, it is assumed that information indicating whether an image signal of the pixel 400 in the previous image frame has low illumination is stored in the FD capacitor $C_{FD}$. Before applying a "high" signal to the reset transistor R to read a reset signal, in a $C_{FD}$ READ period, a "high" signal is applied to the selector transistor S to read low illumination information indicating whether an image signal of the pixel 400 in the previous image frame stored in the FD capacitor $C_{FD}$ has low illumination.

Operations in RST READ, Signal READ and CDS & ADC periods may be similar to those of a general image sensor. For example, a "high" signal is applied to the RST_col line and a gate signal of the reset transistor R goes "high", so that a reset signal is output. Then, in the Sig READ period, a gate signal TX of the transmission transistor T goes "high" so that an image signal corresponding to photocharges accumulated by incident light is output.

Then, in the CDS & ACD period, the binning determination unit 311 of the column readout unit 231 performs, if received low illumination information indicates that the corresponding pixel is a low illumination pixel, analog binning using image signals read out from adjacent pixels on the same row, and if the corresponding pixel is not a low illumination pixel, the binning determination unit 311 transfers the image signal to the noise removing unit 312 without performing binning (see FIGS. 2, 3 and 5). The noise removing unit 312 removes noise from the image signal using a reset signal, and the ADC 313 converts the noise-removed image signal into a digital signal. The digital image signal is stored in the latch 314 and then output through the column decoder 240.

The digital image signal is input to the low illumination determination unit 315 to be determined whether the signal has low illumination. The low illumination information updating unit 316 updates low illumination information depending on the determination on whether the signal has low illumination, and writes the updated low illumination information as an RST-col signal in a pixel analog memory in a $C_{FD}$ WRITE period. In the $C_{FD}$ WRITE period, the RST signal also goes "high" and accordingly the RST_col signal is transferred to the floating diffusion node FD. That is, depending on the determination on whether the read image signal has low illumination, the level of the RST_col signal in the $C_{FD}$ WRITE period may be adjusted. This operation may be repeatedly performed as needed.

Accordingly, low illumination information stored in the floating diffusion node FD and indicating whether an image signal for the previous image frame has low illumination is read out from the floating diffusion node FD before the reset transistor R is turned on to output a reset signal, and after an image signal created by accumulation of photocharges of the photodiode PD for a current image frame is output, low illumination information indicating whether the image signal for the current image frame has low illumination is stored.

Local binning in a charge domain will be described with reference to FIGS. 6 through 13.

The effect of sensitivity enhancement through binning may be strongest when the binning is performed in a charge domain. A general image sensor having a 4Tr structure allows only row-directional control. To perform local binning in a charge domain, binning is controlled for each pixel. For example, pixels on the same row are individually controlled. As analog binning described above may not control pixels individually, the unit pixels and the column readout units (231, 232, . . . ) (see FIG. 2) may be modified so that local binning in a charge domain can be performed.

Figure 6:
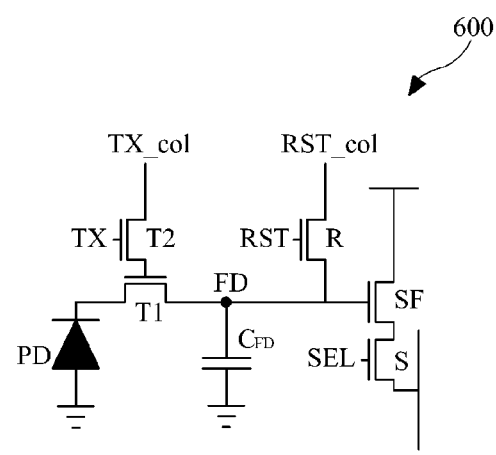
FIG. 6 is a circuit diagram illustrating a pixel structure for local binning in a charge domain, according to an example embodiment.

FIG. 6 shows a circuit diagram illustrating a pixel structure 600 for local binning in a charge domain, according to an example embodiment.

As illustrated in FIG. 6, for column-directional control, the pixel 600 further includes, in addition to the pixel structure 400 illustrated in FIG. 4, a transmission control transistor T2 connected to the gate of a transmission transistor T1, and a column bus line TX_col connected to a transmission control transistor T2. Charges accumulated by a photodiode PD are transferred to a floating diffusion node FD when the transmission control transistor T2 and a transmission transistor T1 are all turned on. Low illumination information is stored in a capacitor $C_{FD}$ connected to the floating diffusion node FD.

Accordingly, the pixel 600 allows binning control with respect to individual pixels. Also, for binning in a charge domain, the floating diffusion node FD is connected to a node which receives photocharges transmitted from a photodiode of another pixel. Since signals transmitted from the TX_col and RST_col lines temporally overlap each other, the TX_col and RST_col lines may be implemented as a single line.

A shared pixel structure may be used for reduction in pixel size. Hereinafter, local binning of a charge domain in a shared pixel structure will be described with reference to FIGS. 7 to 13.

Figure 7:
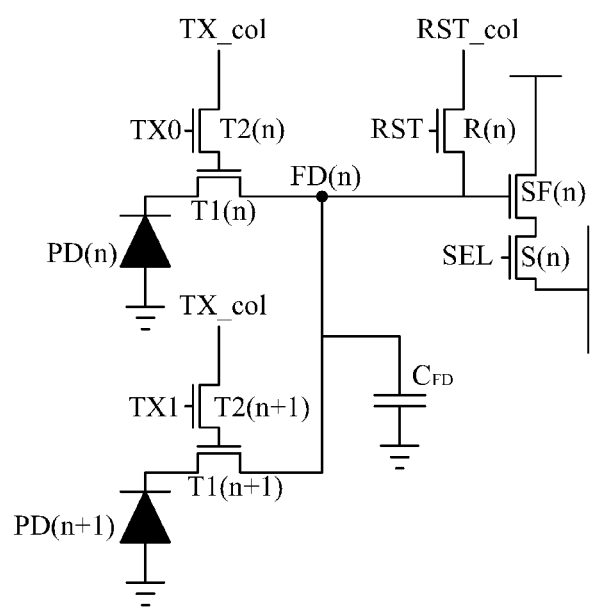
FIG. 7 is a circuit diagram illustrating a shared pixel structure for local binning in a charge domain, according to an example embodiment.

FIG. 7 shows a circuit diagram illustrating a shared pixel structure for local binning in a charge domain, according to an example embodiment.

As illustrated in FIG. 7, a reset transistor R(n), a source follower transistor SF(n) and a selector transistor S(n) are shared by two pixels. A gate signal SEL of the selector transistor S(n), a gate signal RST of the reset transistor R(n), a gate signal TX0 of a transmission control transistor T2(*n*) and a gate signal of a transmission transistor T1(*n*) are applied for each row, and a drain signal RST_col of the reset transistor R(n) and a drain signal TX_col of the transmission control transistor T2(*n*) are provided by the column readout unit 231 (see FIG. 2.)

In the example embodiment, it is assumed that the row of photodiodes PD(n) connected to the signal TX0 is an n-th row and the row of photodiodes PD(n+1) connected to the signal TX1 is a (n+1)-th row.

Figure 8A:
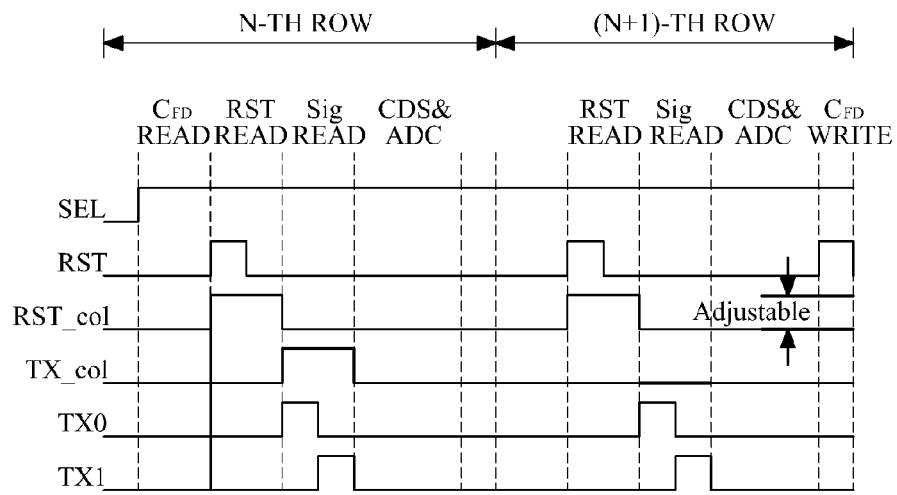
FIG. 8A is a timing diagram illustrating an operation of the shared pixel illustrated in FIG. 7 when binning is performed.

FIG. 8A shows a timing diagram illustrating an operation of the shared pixel structure illustrated in FIG. 7 when binning is performed.

Referring to FIG. 8A, in the operation of an n-th row, if a SEL signal goes "high," in a $C_{FD}$ READ period, low illumination information determined based on an image signal of the previous image frame is output to the column readout unit 231. Here, if the read low illumination information indicates low illumination, the column readout unit 231 controls an RST_col signal and a TX_col signal to perform binning.

Then, in a RST READ period, a reset voltage is applied to the RST_col line and thus the RST signal goes "high," thereby outputting the reset signal. Then, the RST signal and the RST_col signal return to "low," and then in a Sig READ period, a TX_col signal goes "high." Also, in the Sig READ period, the TX0 signal goes "high" in the beginning duration of the Sig READ period to transfer photocharges accumulated in the photodiode PD(n) to the floating diffusion node FD, and a TX1 signal goes "high" in the end duration of the Sig READ period to transfer photocharges accumulated in the photodiode PD(n+1) to the floating diffusion node FD, so that binning in a charge domain is performed. Then, an image signal n corresponding to the result of the binning is output.

In a CDS&ACD period, noise of the image signal n is removed using the reset signal, and the noise-removed image signal n is converted into a digital signal and then output outside the image sensor 200 (see FIG. 2). Also, the column readout unit 231 determines whether the digital image signal has low illumination and updates low illumination information.

Since the operation at a (n+1)-th row is performed based on the low illumination information determined in the operation at the n-th row, no $C_{FD}$ READ period exists in the (n+1)-th period, but a $C_{FD}$ WRITE period during which low illumination information for the image signal n is written in the $C_{FD}$ exists in the end duration of the operation at the (n+1)-th row. Also, in the operation at the (n+1)-th row, in a Sig READ period, the TX_col signal continues to be maintained in a "low" level, so that photocharges accumulated in the photodiodes PD(n) and PD(n+1) are not transferred.

The updated low illumination information is written in the floating diffusion node FD using the RST signal and RST_col signal in the $C_{FD}$ WRITE period of the (n+1)-th row. Since the low illumination information may be set to a "high" or "low" level depending on whether it indicates low illumination or non-low illumination, in the $C_{FD}$ WRITE period, a value of the RST_col signal is adjustable.

Figure 8B:
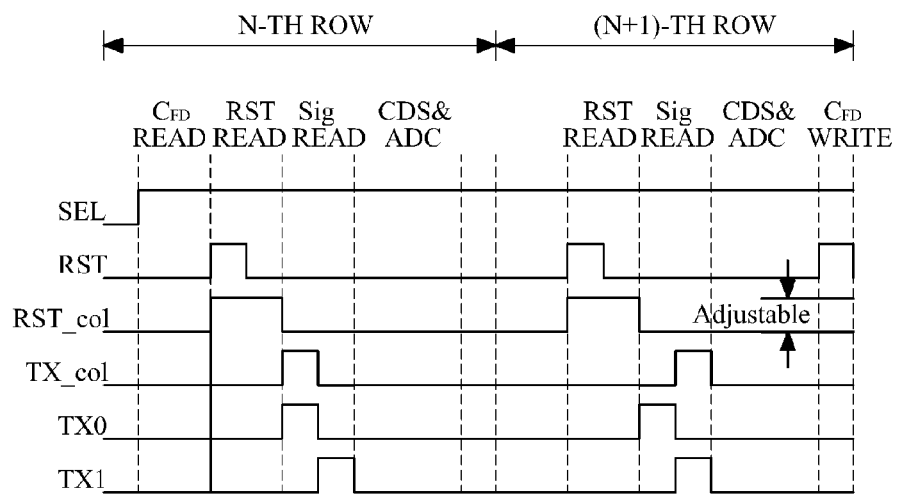
FIG. 8B is a timing diagram illustrating an operation of the shared pixel illustrated in FIG. 7 when no binning is performed.

FIG. 8B shows a timing diagram illustrating an operation of the shared pixel structure illustrated in FIG. 7 when no binning is performed.

The operation of the shared pixel structure illustrated in FIG. 7 when no binning is performed is similar to the operation when binning is performed, except for the operation in the Sig READ period. Referring to FIG. 8B, in the operation at an n-th row, if a SEL signal goes "high," low illumination information stored in the floating diffusion node FD(n) in a $C_{FD}$ READ period and determined according to an image signal of the previous image frame is output to the column readout unit 231. Here, the column readout unit 231 controls, if the read low illumination information indicates non-low illumination, an RST_col signal and a TX_col signal such that no binning is performed.

In an RST READ period, a reset voltage is applied to the RST_col line, an RST signal goes "high" and thus a reset signal is output. In a Sig READ period, a TX_col signal is maintained in a "high" level only while a TX0 signal is in a "high" level. Accordingly, during the period for which the TX_col and TX0 signals are all maintained in a "high" level, photocharges accumulated in the photodiode PD(n) are transferred to the floating diffusion node FD(n), so that an image signal n corresponding to the photocharges is output.

Thereafter, in a CDS&ACD period, noise is removed from the image signal n using the output reset signal, and the noise-removed image signal n is converted into a digital signal and then output outside the image sensor.

At the operation of a (n+1)-th row, in an RST READ period, a reset signal is output, and in a Sig READ period, a TX_col signal goes "high" only while a TX1 signal is in a "high" level. Thus, photocharges accumulated in the photodiode PD(n+1) are transferred to the floating diffusion node FD, so that an image signal (n+1) corresponding to the photocharges accumulated in the photodiode PD(n+1) is output.

Then, in a CDS&ACD period, noise is removed from the image signal (n+1) using the output reset signal, and the noise-removed image signal (n+1) is converted into a digital signal and then output outside the image sensor. Also, a determination on whether there is low illumination in consideration of the image signals n and (n+1) is performed, and low illumination information may be updated. The updated low illumination information is written in the floating diffusion node FD(n) in a $C_{FD}$ WRITE period of the (n+1)-th row. Since the low illumination information may be set to a "high" or "low" level depending on whether it indicates low illumination, in the $C_{FD}$ WRITE period, a value of the RST_col signal is adjustable.

Figure 9:
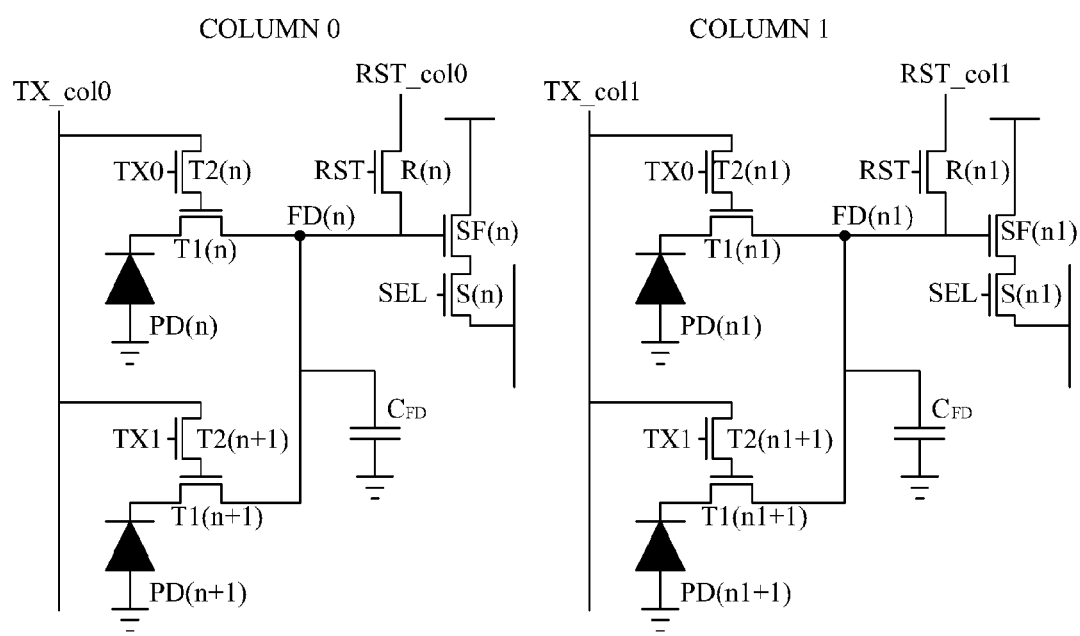
FIG. 9 is a circuit diagram illustrating a pixel structure where the shared pixel structure illustrated in FIG. 7 is expanded in a column direction, according to an example embodiment.

FIG. 9 shows a circuit diagram illustrating a pixel structure where the shared pixel structure illustrated in FIG. 7 is expanded in a column direction, according to an example embodiment.

Hereinafter, the case where a column 0 is subjected to binning in a charge domain by signals TX_col0 and RST_col0 that are controlled by the column readout unit 231 and where a column 1 is not subjected to binning in a charge domain by signals TX_col1 and RST_col1 that are controlled by the column readout unit 232, will be described with reference to FIGS. 2, 9 and 10.

Figure 10:
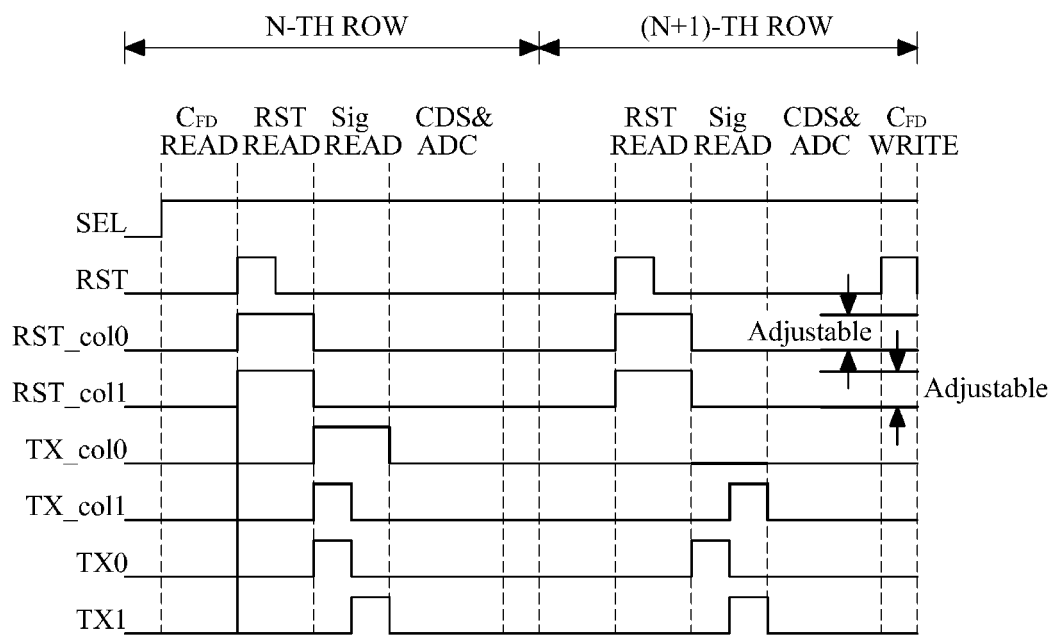
FIG. 10 is a timing diagram illustrating an operation of the pixel structure illustrated in FIG. 9.

FIG. 10 shows a timing diagram illustrating an operation of the pixel structure illustrated in FIG. 9.

At the operation of an n-th row on the column 0, if a SEL signal goes "high," in a $C_{FD}$ READ period, low illumination information based on an image signal of the previous image frame is output to the 0-th column readout unit 231. Here, the 0-th column readout unit 231 controls, when the read low illumination information indicates low illumination, RST_col0 and TX_col0 signals to perform binning.

Then, in an RST READ period, a reset voltage is applied to the RST_col0 line, an RST signal goes "high" and thus a reset signal is output. Then, the RST and RST_col0 signals return to a "low" level, and in a Sig READ period, a TX_col0 signal is maintained in a "high" level. A TX0 signal goes "high" at the beginning duration of the Sig READ period to transfer photocharges accumulated in the photodiode PD(n) to the floating diffusion node FD, and a TX1 signal goes "high" at the end duration of the Sig READ period to transfer photocharges accumulated in the photodiode PD(n+1) to the floating diffusion node FD, so that binning in a charge domain is performed. Then, an image signal n corresponding to the result of the binning is output.

Since the operation at a (n+1)-th row is performed based on the low illumination information determined in the operation at the n-th row, no $C_{FD}$ READ period exists in the (n+1)-th period, but a $C_{FD}$ WRITE period during which low illumination information for the image signal n is written in the $C_{FD}$ exists in the end duration of the (n+1)-th row operation. Also, in the operation at the (n+1)-th row, in a Sig READ period, the TX_col0 signal continues to be maintained in a "low" level, so that photocharges accumulated in the photodiodes PD(n) and PD(n+1) are not transferred.

The updated low illumination information is written in a floating diffusion node FD in a $C_{FD}$ WRITE period for the (n+1)-th row. Since the low illumination information may be set to a "high" or "low" level depending on whether it indicates low illumination or non-low illumination, in the $C_{FD}$ WRITE period, a value of the RST_col signal is adjustable.

At the operation of the column 1, if a SEL signal goes "high," in a $C_{FD}$ READ period, low illumination information based on an image signal of the previous image frame is output to the first column readout unit 232. Here, the first column readout unit 232 controls, when the read low illumination information indicates non-low illumination, RST_col1 and TX_col1 signals not to perform binning.

Then, in an RST READ period, a reset signal is output, and in a Sig READ period, a TX_col1 signal is maintained in a "high" level only while a TX1 signal is in a "high" level. Accordingly, photocharges accumulated in the photodiode PD(n1) are transferred to the floating diffusion node FD, so that an image signal n1 corresponding to the accumulated photocharges is output. Thereafter, in a CDS&ACD period, noise is removed from the image signal n1 using is the output reset signal, and the noise-removed image signal n1 is converted into a digital signal and then output outside the image sensor. Also, a determination on whether the image signal n1 has low illumination may be performed and low illumination information may be updated.

At the operation of a (n+1)-th row, in an RST READ period, a reset signal is output, and in a Sig READ period, a TX_col1 signal is in a "high" level only while a TX1 signal is in a "high" level. Accordingly, photocharges accumulated in the photodiode PD(n1+1) are transferred to the floating diffusion node FD, so that an image signal n1+1 corresponding to photocharges accumulated in the photodiode PD(n1+1) is output. Then, in a CDS&ACD period, noise is removed from the image signal (n1+1) using the output reset signal, and the noise-removed image signal (n1+1) is converted into a digital signal and then output outside the image sensor. Also, a determination on whether the image signal (n1+1) has low illumination is performed. Updating of low illumination information may be performed in consideration of the image signals n1 and (n1+1).

Figure 11:
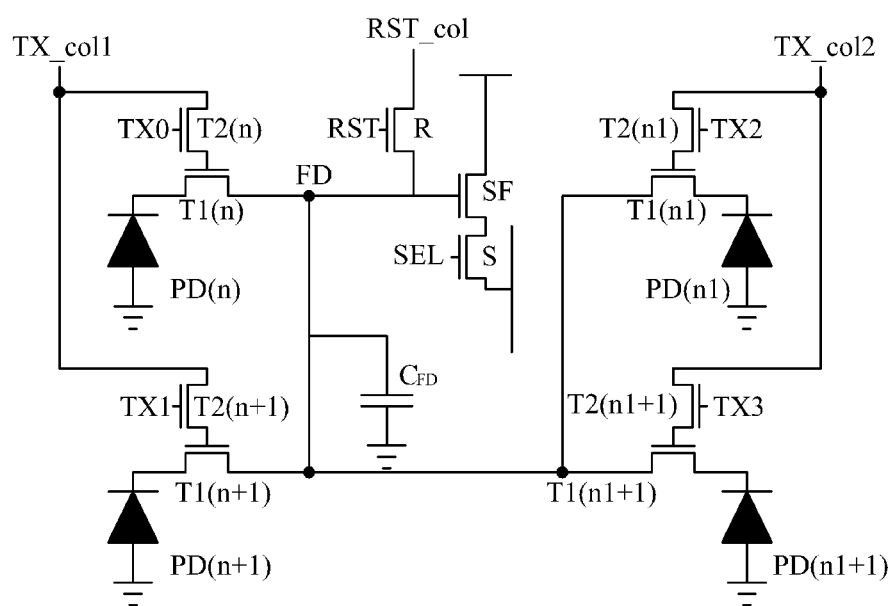
FIG. 11 is a circuit diagram illustrating a 2×2 shared pixel structure for local binning in a charge domain, according to an example embodiment.

FIG. 11 shows a circuit diagram illustrating a 2×2 shared pixel structure for local binning in a charge domain, according to an example embodiment.

As illustrated in FIG. 11, a reset transistor R, a source follower transistor SF and a selector transistor S are shared by four transmission control transistors T2(*n*), T2(*n*+1), T2(n1) and T2(n1+1), four transmission transistors T1(*n*), T1(*n*+1), T1(n1) and T1(n1+1), and photodiodes PD(n), PD(n+1), PD(n1) and PD(n1+1).

Figure 12:
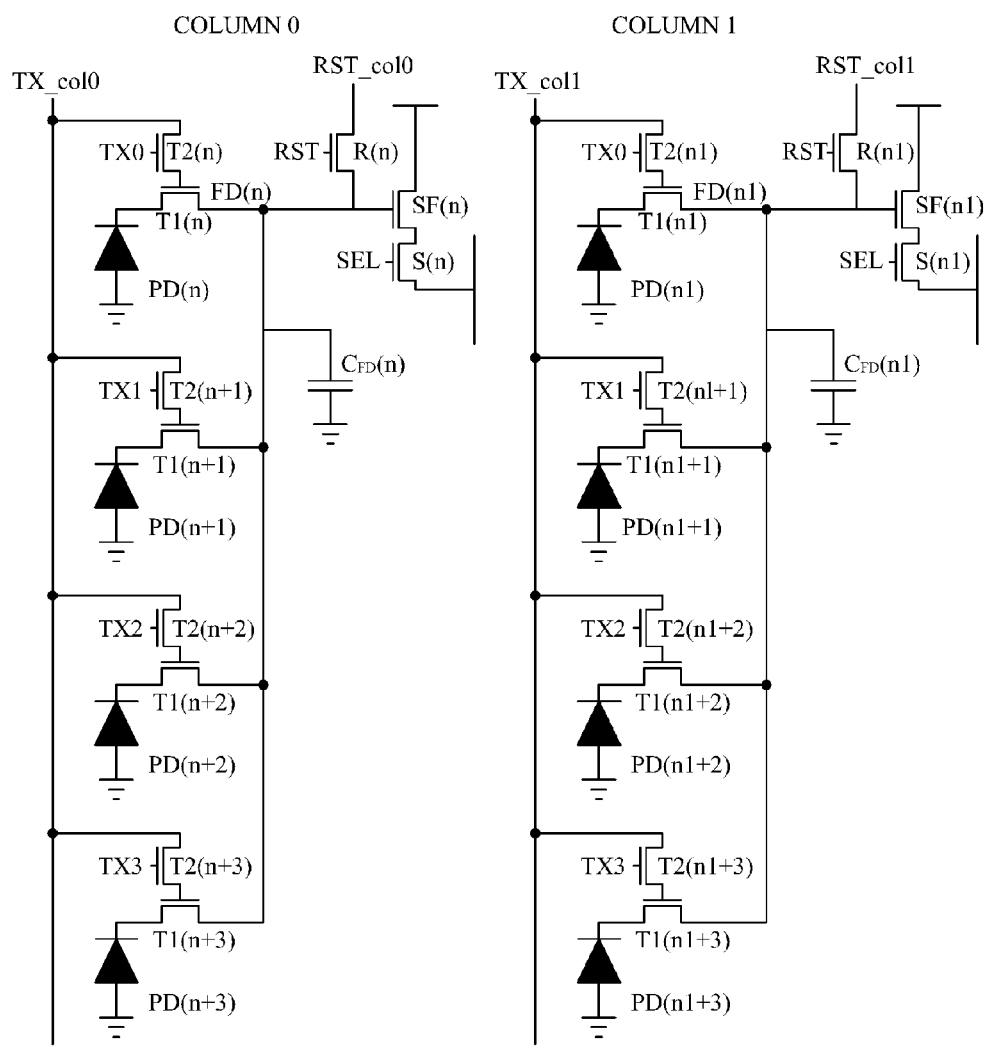
FIG. 12 is a circuit diagram illustrating a 1×4 shared pixel structure for local binning in a charge domain, according to an example embodiment.

FIG. 12 shows a circuit diagram illustrating a 1×4 shared pixel structure for local binning in a charge domain, according to an example embodiment.

In the pixel structure illustrated in FIG. 12, when it is assumed that pixels on the first row have the same color as those on the third row and pixels on the second row have the same color as those on the fourth row, binning may be performed between pixels having the same color.

Figure 13:
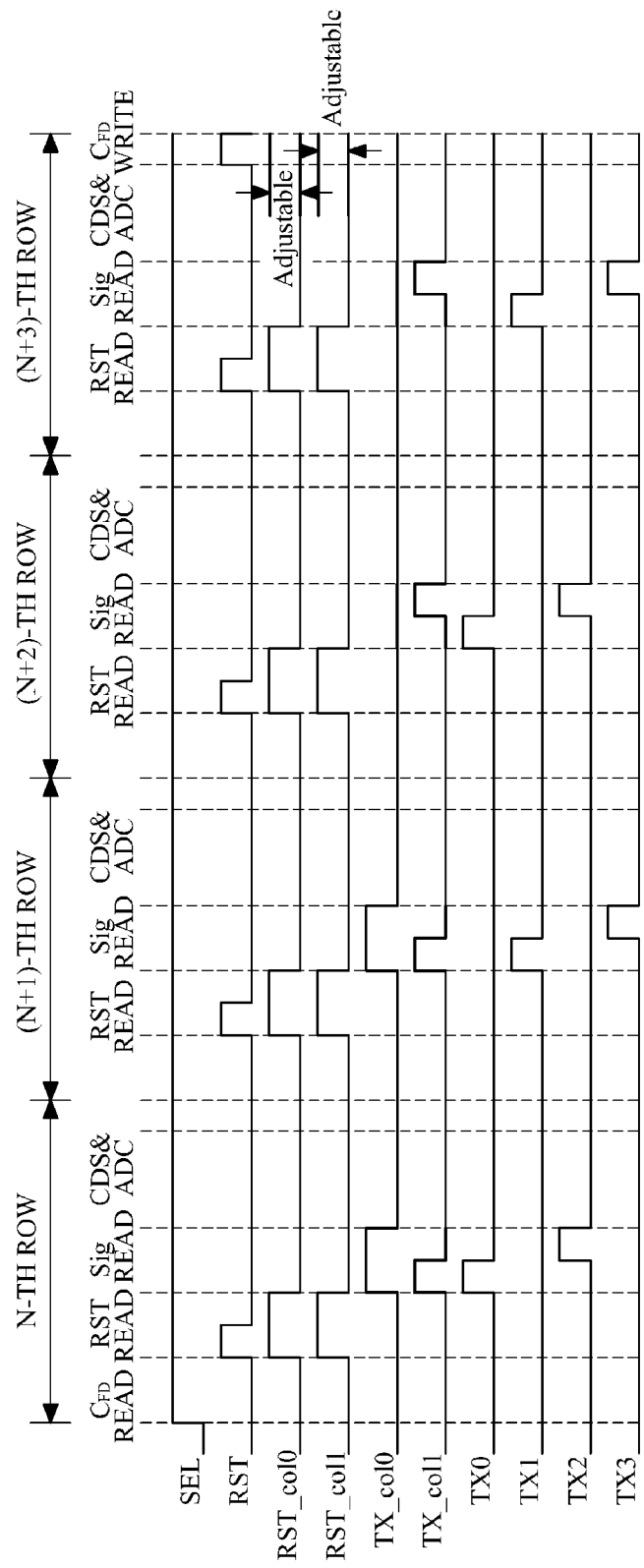
FIG. 13 is a timing diagram illustrating an operation of the shared pixel structure illustrated in FIG. 12 when binning is performed in a $0^{th}$ column and no binning is performed in a $1^{st}$ column.

FIG. 13 shows a timing diagram illustrating a binning operation which is performed between pixels having the same color.

FIG. 13 shows a timing diagram illustrating an operation of the shared pixel structure illustrated in FIG. 12 when binning is performed in a $0^{th}$ column and no binning is performed in a $1^{st}$ column.

Referring to FIG. 13, at an n-th row on a column 0, in a Sig READ period, a TX_col0 signal is maintained in a "high" level and TX0 and TX2 signals go "high," so that photocharges accumulated in the photodiodes PD(n) and PD(n+2) are transferred to the floating diffusion node FD(n) and thus an image signal n subjected to binning is output. Meanwhile, at an n-th row on a column 1, in a Sig READ period, a TX_col1 signal is in a "high" level only in the period for which a TX0 signal is in a "high" level, so that photocharges accumulated in the photodiode PD(n1) are transferred to the floating diffusion node FD(n1) and thus an image signal not subjected to binning is output.

At a (n+1)-th row on the column 0, in a Sig READ period, a TX_col0 signal is maintained in a "high" level and TX1 and TX3 signals go "high," so that photocharges accumulated in the photodiodes PD(n+1) and PD(n+3) are transferred to the floating diffusion node FD(n) and thus an image signal subjected to binning is output. Meanwhile, at a (n+1)-th row on a column 1, in a Sig READ period, a TX_col1 signal is in a "high" level only in the period for which a TX1 signal is in a "high" level, so that photocharges accumulated in the photodiode PD(n1+1) are transferred to the floating diffusion node FD(n1) and thus an image signal not subjected to binning is output.

At a (n+2)-th row on the column 0, in a Sig READ period, a TX_col signal is maintained in a "low" level, so that no photocharges accumulated in the photodiodes PD(n) and PD(n+2) are transmitted although TX0 and TX2 signals that are in a "high" level are applied. Meanwhile, at a (n+2) row on the column 1, in a Sig READ period, a TX_col1 signal is in a "high" level in the period for which a TX2 signal is in a "high" level, so that photocharges accumulated in the photodiode PD(n1+2) are transferred to the floating diffusion node FD(n1) and thus an image signal not subjected to binning is output.

At a (n+3)-th row on the column 0, in a Sig READ period, a TX_col0 signal is maintained in a "low" level, so that no photocharges accumulated in the photodiodes PD(n+1) and PD(n+3) are transmitted although TX1 and TX3 signals that are in a "high" level are applied. Meanwhile, at a (n+3)-th row on the column 1, in a Sig READ period, a TX_col1 signal goes "high" only in the period for which a TX3 signal is in a "high" level, so that photocharges accumulated in the photodiode PD(n1+3) are transferred to the floating diffusion node FD(n1) and thus an image signal not subjected to binning is output.

The operation in the remaining periods is similar to that described above along with the previous timing diagrams, and accordingly a further description thereof will be omitted for conciseness. According to the above-described example embodiments, binning can be controlled for individual pixels by adding a transistor to each unit pixel, and binning on image information can be performed for each color.

Figure 14:
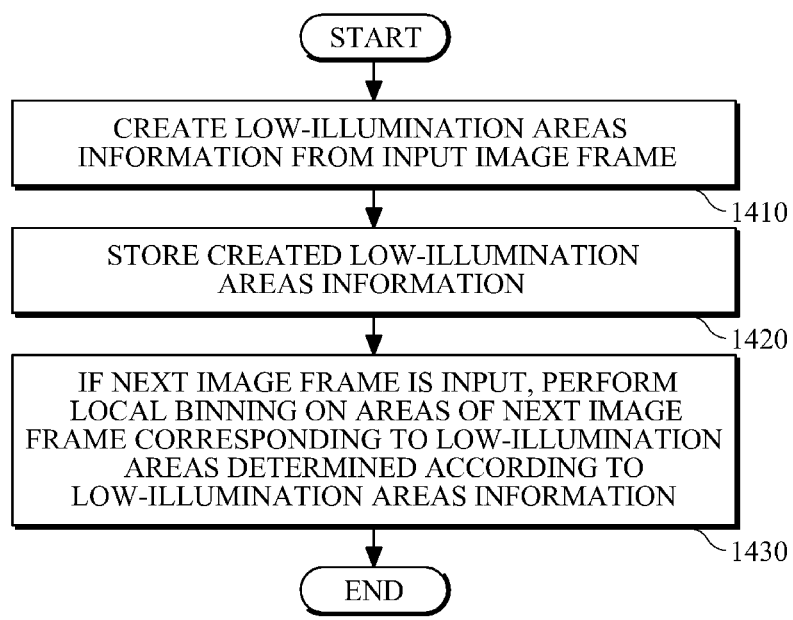
FIG. 14 is a flowchart illustrating an image processing method for local binning, according to an example embodiment.

FIG. 14 shows a flowchart of an image processing method for local binning, according to an example embodiment. The method may be performed using an image processing apparatus according to an example embodiment described above.

Low illumination area information is created from a pixel array including a plurality of unit pixels arranged in a matrix form (1410), and the low illumination area information is stored (1420). The low illumination area information may be stored in each pixel included in an image sensor, or in a separate memory.

If a next image frame is received, binning is performed on the next image frame with respect to low illumination areas determined according to the low illumination area information (1430). The local binning may be performed in a charge domain, in an analog domain and/or in a digital domain. The low illumination area information may be updated whenever a new image frame is received.

According to examples described above, an image sensor is provided which applies binning selectively, for example, applying binning on low illumination areas and not applying binning on non-low illumination areas. Accordingly, losses in spatial resolution may be minimized or prevented.

By performing binning on low illumination areas according to an example local binning technique described above, high-sensitivity images may be acquired without having to sacrifice spatial resolution of non-low illumination areas. In an example case of analog local binning, since a minimal additional circuit is installed only in a column side without having to install additional hardware in each pixel, analog local binning may be useful for applications in which miniaturization of pixels is desired, for example, applications in electronics device such as a camera for a mobile phone, a digital still camera, and the like.

In an example case of local binning in a charge domain, since a transistor is added to each pixel, such local binning may be more effectively applied to sensors requiring a relatively larger pixel structure, for example, in such electronics device as security or automobile application sensors.

In addition, by utilizing both the analog local binning and the local binning in a charge domain, further sensitivity enhancement may be achieved. Furthermore, the structure where sensitivity is enhanced by performing local binning only on low illumination areas may achieve an additional effect of enhancing a dynamic range at low illumination areas. Also, since high-sensitivity can be implemented without having to sacrifice spatial resolution at non-low illumination areas, the local binning may be applied to various other applications.

The term "pixel," as used herein, refers to a photo-element unit cell containing at least a photosensor for converting photons to electrical changes. In addition, although a photodiode is described, embodiments include any type of detector or photosensor of each pixel, which may be implemented, as nonlimiting examples only, as a pinned photodiode, a p-n junction photodiode, a Schottky photodiode, a photogate, or any other suitable photoconversion device or device that may accumulate and/or store photocharges.

As a non-exhaustive illustration only, the electronics device described herein may refer to mobile devices such as a cellular/mobile phone, a personal digital assistant (PDA), a digital camera, a portable game console, an MP3 player, a portable/personal multimedia player (PMP), a handheld e-book, a portable tablet/laptop PC, a global positioning system (GPS) navigation, and devices such as a camcorder, a robot, a security camera device, a web camera device, a television, a monitor, a home-entertainment setup box, and the like equipped with an image sensor consistent with that disclosed herein.

The processes, functions, methods and/or software described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable media include magnetic media, such as hard disks, floppy disks, and magnetic tape; optical media such as CD-ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

A number of example embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An image sensor, comprising:
   a pixel array comprising a plurality of unit pixels; and
   a column readout circuit comprising a plurality of column readout units, each column readout unit provided for a line of the plurality of unit pixels, the column readout circuit being configured to:
      acquire an image frame from the pixel array,
      create low illumination area information indicating low illumination areas of the image frame, and
      in response to another image frame being received, perform local binning on areas of the another image frame corresponding to the low illumination areas, wherein the low illumination area information of the image frame indicates which unit pixels of the plurality of unit pixels have low illumination, and the low illumination area information is stored in the plurality of unit pixels and read from the plurality of unit pixels through the column readout units.

2. The image sensor of claim 1, wherein the column readout circuit performs local binning on the areas corresponding to the low illumination areas in an analog domain using an image signal of the another image frame.

3. The image sensor of claim 2, wherein a column readout unit of the plurality of column readout units comprises:
   a binning determination unit configured to:
      determine whether an image signal output from a unit pixel is to be binned with an image signal of another unit pixel, based on low illumination information read from the unit pixel; and
      perform binning using the image signal read from the another unit pixel on the same row according to the result of the determination;
   a noise removing unit configured to remove noise from the image signal;
   an analog-to-digital converter configured to convert the noise-removed image signal into a digital image signal;
   a latch configured to store the digital image signal;
   a low illumination determination unit configured to determine whether the image signal output from the unit pixel has low illumination using the digital image signal; and
   a low illumination information updating unit configured to update previously stored low illumination information according to the result of the determination.

4. The image sensor of claim 3, wherein the updated low illumination information is stored in the unit pixel and used to determine through the binning determination unit whether binning is to be performed on an image signal of still another image frame during a processing period of the still another image frame.

5. The image sensor of claim 2, wherein a unit pixel of the plurality of unit pixels comprises:
   a photodiode configured to receive light and create photocharges;
   a transmission transistor connected to the photodiode, and configured to transfer the photocharges;
   a floating diffusion node configured to accumulate the photocharges transferred from the transmission transistor;
   a reset transistor configured to discharge the photocharges accumulated in the floating diffusion node;
   a source follower transistor configured to amplify the photocharges accumulated in the floating diffusion node into a voltage signal; and
   a selector transistor configured to selectively output an image signal of the unit pixel,
   wherein a drain of the reset transistor is connected to a signal line configured to transfer low illumination information determined by a corresponding column readout unit and indicating whether a value output from the photodiode corresponds to low illumination in the image frame.

6. The image sensor of claim 5, wherein the low illumination information is stored in a capacitor of the floating diffusion node.

7. The image sensor of claim 5, wherein:
   the low illumination information is stored in the floating diffusion node;
   the low illumination information stored in the floating diffusion node and indicating whether an image signal of the image frame has low illumination is read from the floating diffusion node before the reset transistor is turned on to output a reset signal; and
   after an image signal created by accumulation of photocharges of the photodiode for a current image frame is output, low illumination information indicating whether the image signal for the current image frame has low illumination is stored in the floating diffusion node.

8. The image sensor of claim 1, wherein the column readout circuit is further configured to control each unit pixel of the pixel array to perform local binning in a charge domain.

9. The image sensor of claim 8, wherein a column readout unit of the plurality of column readout units comprises:
   a binning determination unit configured to:
      determine whether an image signal output from a unit pixel is to be binned with an image signal of another unit pixel, based on low illumination information read from the unit pixel; and
      generate a control signal to perform local binning in the charge domain according to the result of the determination;
   a noise removing unit configured to remove noise from the image signal;
   an analog-to-digital converter configured to convert the noise-removed image signal into a digital image signal;
   a latch configured to store the digital image signal;
   a low illumination determination unit configured to determine whether the image signal output from the unit pixel has low illumination using the digital image signal; and
   a low illumination information updating unit configured to update the low illumination information according to the result of the determination.

10. The image sensor of claim 8, wherein binning is controlled for each unit pixel.

11. The image sensor of claim 10, wherein a unit pixel of the plurality of unit pixels comprises:
   a photodiode configured to receive light and create photocharges;
   a transmission transistor connected to the photodiode, and configured to transfer the photocharges;
   a transmission control transistor configured to control the transmission transistor;
   a floating diffusion node configured to accumulate the photocharges transferred from the transmission transistor;
   a reset transistor configured to discharge the photocharges accumulated in the floating diffusion node;
   a source follower transistor configured to amplify the photocharges accumulated in the floating diffusion node into a voltage signal; and
   a selector transistor configured to selectively output an image signal of the unit pixel,
   wherein a drain of the reset transistor is connected to a signal line configured to transmits low illumination information indicating low illumination or non-low illumination, and
   wherein the floating diffusion node is connected to a node configured to receive photocharges transmitted from another photodiode.

12. The image sensor of claim 11, wherein, in response to both the transmission control transistor and the transmission transistor being turned on, the photocharges accumulated by the photodiode are transferred to the floating diffusion node.

13. The image sensor of claim 11, wherein the low illumination information is stored in a capacitor of the floating diffusion node.

14. The image sensor of claim 11, wherein the low illumination information is stored in the floating diffusion node,
   the low illumination information stored in the floating diffusion node and indicating whether an image signal of the image frame has low illumination is read from the floating diffusion node before the reset transistor is turned on to output a reset signal, and
   after an image signal created by accumulation of photocharges of the photodiode for a current image frame is output, low illumination information indicating whether the image signal for the current image frame has low illumination is stored in the floating diffusion node.

15. An image processing method performed by an image sensor, the method comprising:
   creating low illumination area information indicating low illumination areas of an image frame received from a pixel array having a plurality of unit pixels;
   storing the created low illumination area information in the plurality of unit pixels; and
   in response to another image frame being received, performing local binning on areas of the another image frame corresponding to the low illumination areas indicated by the low illumination area information, wherein the low illumination area information of the image frame indicates which unit pixels of the plurality of unit pixels have low illumination.

16. The image processing method of claim 15, wherein the low illumination area information is stored in unit pixels included in the image sensor, or in a separate memory.

17. The image processing method of claim 15, wherein the low illumination area information is updated in response to a new image frame being received.

18. The image processing method of claim 15, wherein the local binning is performed in at least one of a charge domain and an analog domain.

19. The image processing method of claim 15, wherein the local binning is performed in a digital domain.

20. An image sensor, comprising:
   an array configured to acquire an image;
   a determination unit configured to identify pixels of an acquired image for selective binning, according to output values of the pixels, wherein the identified pixels of the acquired image have relatively low illumination compared to other pixels of the acquired image for selective binning; and
   a binning unit configured to perform binning with respect to pixels of another acquired image corresponding to the pixels of the acquired image selected for binning, wherein information about the identified pixels of the acquired image with relative low illumination is stored in the pixels.

21. The image sensor of claim 20, wherein the determination unit is further configured to determine a pixel of the acquired image whose output value is equal to or less than a predetermined value, less than that of an adjacent pixel, or equal to or less than a predetermined value less than that of an adjacent pixel as a pixel with low illumination for selective binning.

22. The image sensor of claim 20, wherein:
   the binning unit is further configured to perform binning with respect to pixels of the another acquired image corresponding to the pixels of the acquired image having low illumination.

23. The image sensor of claim 20, wherein:
   the binning unit is further configured to perform binning with respect to pixels of a second image corresponding to the pixels of the acquired image having low illumination to produce a first processed image.

24. The image sensor of claim 23, wherein:
   the determination unit is further configured to identify pixels of the second image having relatively low illumination compared to other pixels of the second image for selective binning; and
   the binning unit is further configured to perform binning with respect to pixels of a third image corresponding to the pixels of the second image having low illumination to produce a second processed image.

25. The image sensor of claim 20, wherein:
the acquired image is provided by a predetermined number of pixels;
the determination unit is further configured to identify part of the predetermined number of pixels of the acquired image having relatively low illumination compared to other pixels of the acquired image for selective binning; and
the binning unit is further configured to perform binning with respect to pixels of the another acquired image corresponding to the part of the predetermined number of pixels of the acquired image having low illumination.

26. The image sensor of claim 20, wherein the binning is performed in at least one of a charge domain and an analog domain.

27. The image processing method of claim 20, wherein the local binning is performed in a digital domain.

28. An image processing method performed by an image sensor having an array, a determination unit and a binning unit, the method comprising:
acquiring an image by the array;
identifying, by the determination unit, pixels of the acquired image for selective binning, according to output values of the pixels, wherein the identified pixels of the acquired image have relatively low illumination compared to other pixels of the acquired image for selective binning;
binning, by the binning unit, with respect to pixels of another acquired image corresponding to the pixels of the acquired image selected for binning; and
storing information about the identified pixels of the acquired image with relative low illumination in the pixels.

29. The image processing method of claim 28, wherein the identifying comprises determining a pixel of the acquired image whose output value is equal to or less than a predetermined value, less than that of an adjacent pixel, or equal to or less than a predetermined value less than that of an adjacent pixel as a pixel with low illumination for selective binning.

30. The image processing method of claim 28, wherein:
the binning comprises binning with respect to pixels of the another acquired image corresponding to the pixels of the acquired image having low illumination to produce a first processed image.

31. The image processing method of claim 30, further comprising:
identifying, by the determination unit, pixels of the another acquired image having relatively low illumination compared to other pixels of the another acquired image for selective binning; and
binning, by the binning unit, with respect to pixels of still another acquired image corresponding to the pixels of the another acquired image having low illumination to produce a second processed image.

32. The image processing method of claim 28, wherein:
the acquired image is provided by a predetermined number of pixels;
the identifying comprises identifying part of the predetermined number of pixels of the acquired image having relatively low illumination compared to other pixels of the acquired image for selective binning; and
the binning comprises binning with respect to pixels of the another acquired image corresponding to the part of the predetermined number of pixels of the acquired image having low illumination.

33. The image processing method of claim 28, wherein the binning comprises binning in at least one of a charge domain and an analog domain.

34. The image processing method of claim 28, wherein the local binning is performed in a digital domain.

35. An electronics device, comprising:
a housing defining the electronics device; and
an image sensor comprising:
an array configured to acquire an image;
a determination unit configured to identify pixels of an acquired image for selective binning, according to output values of the pixels, wherein the identified pixels of the acquired image have relatively low illumination compared to other pixels of the acquired image for selective binning; and
a binning unit configured to perform binning with respect to pixels of another acquired image corresponding to the pixels of the acquired image selected for binning, wherein information about the identified pixels of the acquired image with relative low illumination is stored in the pixels.

36. The electronics device of claim 35, wherein the determination unit is further configured to determine a pixel of the acquired image whose output value is equal to or less than a predetermined value, less than that of an adjacent pixel, or equal to or less than a predetermined value less than that of an adjacent pixel as a pixel with low illumination for selective binning.

37. The electronics device of claim 35, wherein:
the binning unit is further configured to perform binning with respect to pixels of the another acquired image corresponding to the pixels of the acquired image having low illumination to produce a first processed image.

38. The electronics device of claim 37, wherein:
the determination unit is further configured to identify pixels of the another acquired image having relatively low illumination compared to other pixels of the another acquired image for selective binning; and
the binning unit is further configured to perform binning with respect to pixels of still another acquired image corresponding to the pixels of the another acquired image having low illumination to produce a second processed image.

39. The electronics device of claim 35, wherein:
the acquired image is provided by a predetermined number of pixels;
the determination unit is further configured to identify part of the predetermined number of pixels of the acquired image having relatively low illumination compared to other pixels of the acquired image for selective binning; and
the binning unit is further configured to perform binning with respect to pixels of the another acquired image corresponding to the part of the predetermined number of pixels of the acquired image having low illumination.

40. The electronics device of claim 35, wherein the binning is performed in at least one of a charge domain and, an analog domain.

41. The electronics device of claim 35, wherein the electronics device comprises one of a cellular/mobile phone, a personal digital assistant (PDA), a digital camera, a portable game console, an MP3 player, a portable/personal multimedia player (PMP), a handheld e-book, a portable tablet/laptop PC, a global positioning system (GPS) navigation, a camcorder, a robot, a security camera device, a web camera device, a television, a monitor, and a home-entertainment setup box.

42. The image processing method of claim 35, wherein the local binning is performed in a digital domain.

* * * * *